United States Patent [19]

Dominey et al.

[11] 3,985,318

[45] Oct. 12, 1976

[54] HELICOPTER BLADE CRACK INDICATOR

[75] Inventors: Sam C. Dominey, Glendora; John J. Mahoney, San Bernardino, both of Calif.

[73] Assignee: Tyco Laboratories, Inc., Pomona, Calif.

[22] Filed: Nov. 14, 1975

[21] Appl. No.: 631,833

[52] U.S. Cl. .............................. 244/17.11; 116/70; 250/303; 340/416; 416/61
[51] Int. Cl.² ........................................ B64C 27/00
[58] Field of Search ............ 244/17.11, 1 R, 17.13; 416/61, 226; 340/58, 416; 250/303, 497, 374, 360; 73/517 R, 146.4, 146.5; 116/70, 114 P

[56] References Cited
UNITED STATES PATENTS

| | | | |
|---|---|---|---|
| 2,745,969 | 5/1956 | Keller | 250/360 |
| 3,113,464 | 12/1963 | Shulman | 73/517 R |
| 3,158,028 | 11/1964 | Chope | 73/517 R |
| 3,161,774 | 12/1964 | Pinckaers | 250/374 |
| 3,667,862 | 6/1972 | Parr | 416/226 |
| 3,677,218 | 7/1972 | Dixon et al. | 244/17.11 |
| 3,739,376 | 6/1973 | Keledy | 244/17.11 |
| 3,801,787 | 4/1974 | Johnsen | 340/58 |

Primary Examiner—Trygve M. Blix
Assistant Examiner—Galen L. Barefoot
Attorney, Agent, or Firm—Harris, Kern, Wallen & Tinsley

[57] ABSTRACT

Method and apparatus for continuously detecting cracks in aircraft blades while in flight. A hollow blade is sealed with a pressure differential, either above or below atmospheric. A reduction in the pressure differential such as results from cracks, is detected by a pressure sensor having a member which moves between a high pressure differential position and a low pressure differential position. A radiation source, typically a beta source, is carried on the member and moves from a shielded position to an unshielded position when the pressure differential drops. A radiation detector is mounted on a fixed portion of the aircraft and detects radiation from the source when the member moves to the unshielded position. The detector output may be used to operate a go-no go indicator providing a warning signal when the pressure differential falls below a predetermined value, or to operate an analog indicator providing an output varying as a function of the pressure differential.

16 Claims, 5 Drawing Figures

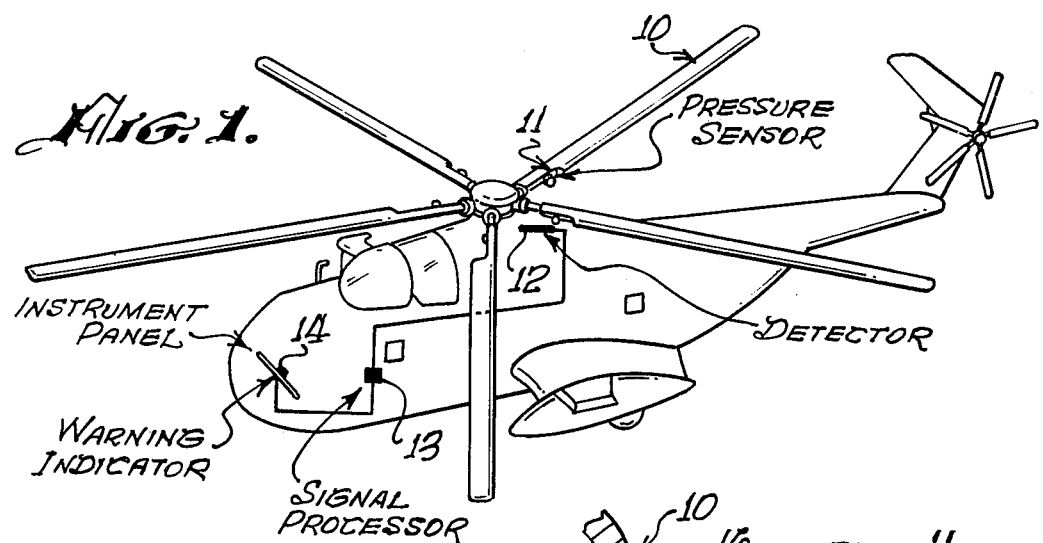
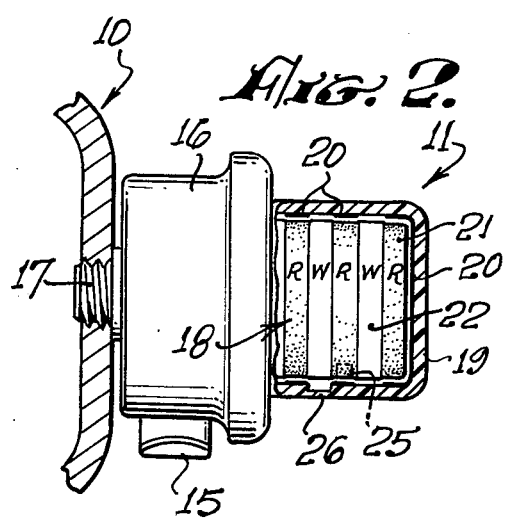
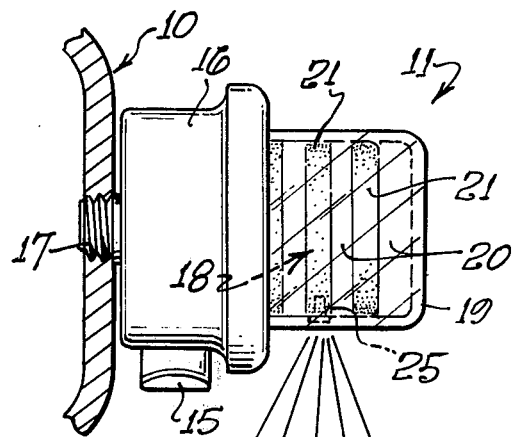
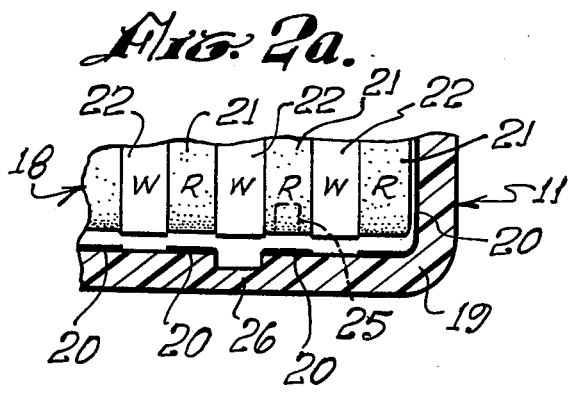
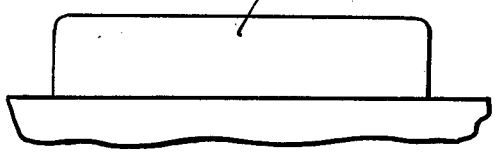

HELICOPTER BLADE CRACK INDICATOR

BACKGROUND OF THE INVENTION

This invention relates to aircraft blades and in particular, to a new and improved method and apparatus for continuously detecting cracks in propeller and helicopter rotor blades.

Aircraft blades are subjected to severe stress and occasionally develop minute cracks. It is of critical importance that the crack in the blade be detected at an early time so that the blade may be replaced preventing an inflight accident. A wide variety of methods are available for detecting cracks, including the making of x-ray pictures and the magnetic flux techniques. However these require considerable equipment and can only be performed when the aircraft is at rest.

Another system presently in use provides a pressure differential in a sealed hollow blade, with the interior blade pressure being either above or below atmospheric. A pressure sensor is mounted on the blade and provides a visual indication of the pressure differential, with a drop in the differential indicating leakage due to a crack. This type of device provides for blade integrity measurement without requiring removal of the blade from the aircraft. However the visual inspection can be performed only when the aircraft is on the ground. It has been suggested that the blade internal pressure be transmitted to an indicator in the cockpit while the aircraft is in flight, utilizing a set of slip rings at the rotating hub for information transmission. However slip ring systems present a number of problems. They are susceptible to dirt and grease, they are difficult to install and maintain, and they increase the cost and complexity of an already complex rotor shaft system.

It is an object of the present invention to provide a new and improved method and apparatus for continuously indicating the condition of hollow aircraft blades while the aircraft is in flight. A further object is to provide such method and apparatus which does not require any connection between the rotating blade and the remainder of the aircraft and which can be utilized to give go-no go indications for safe and warning conditions, and/or proportional type indications as a measure of pressure differential.

SUMMARY OF THE INVENTION

In the method and apparatus of the present invention, a hollow aircraft blade is sealed with a pressure differential with respect to the ambient atmosphere. A reduction in the pressure differential within the blade is detected by a pressure sensor mounted on the blade. The pressure sensor moves a member between a first position for a higher differential pressure and a second position for a lower differential pressure. A radiation source is carried on the moving member and is moved from a shielded position for the higher differential to an unshielded position for the lower differential. A radiation detector is mounted in a fixed location on the aircraft and provides an output indicating when the member of the pressure sensor has moved the source to the unshielded position, thus indicating a reduction in the pressure differential resulting from a crack in the blade. Both go-no go and proportional type circuitry may be utilized for processing the radiation detector output to provide various types of indications as desired.

BRIEF DESCRIPTION OF THE DRAWINGS

FIG. 1 illustrates a helicopter with the system of the invention installed therein;

FIG. 2 is a side view of a portion of a blade with a pressure sensor mounted thereon;

FIG. 2a is an enlarged view of a portion of the pressure sensor of FIG. 2;

FIG. 3 is a view similar to that of FIG. 2 showing the pressure sensor in the low pressure differential condition, in conjunction with the detector mounted on the helicopter.

DESCRIPTION OF THE PREFERRED EMBODIMENTS

Figure 4:
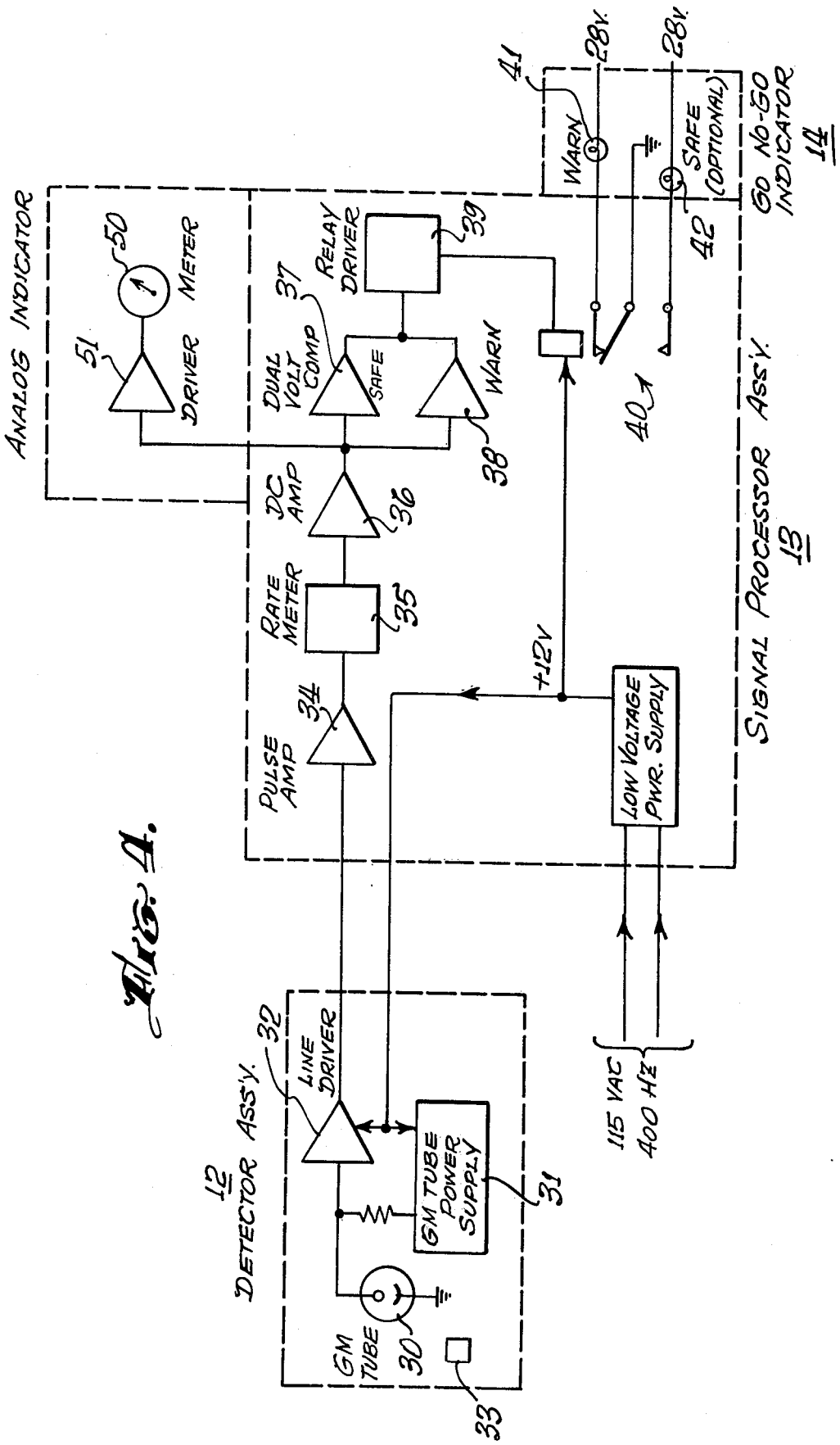
FIG. 4 is a circuit diagram of the system of FIG. 1.

A conventional helicopter with a plurality of rotor blades 10 is shown in FIG. 1. A pressure sensor 11 with a radiation source is mounted on each of the blades. A radiation detector 12 is mounted on a fixed portion of the aircraft adjacent the rotating blades. The system also includes a signal processor 13 containing the electronic circuitry, and a warning indicator 14 for mounting on the instrument panel of the aircraft.

A typical pressure sensor 11 is shown in greater detail in FIGS. 2 and 2a. The pressure sensor includes a housing 16 with a threaded boss 17 for mounting the sensor in a threaded opening in the wall of the blade 10. The sensor also includes a moving member 18 carried within the housing 16 and enclosed by a cover 19.

The hollow rotor blade 10 is sealed with a pressure differential with respect to the ambient atmosphere. In one arrangement, the pressure within the blade may be 10 psi greater than atmospheric, this arrangement normally being referred to as a pressure system. In another arrangement, the pressure within the blade may be 10 psi below atmospheric, this arrangement normally being referred to as a vacuum arrangement. When the desired pressure differential is maintained, the moving member 18 remains in a first position, such as the outboard position shown in FIG. 2. When the pressure differential drops, the member 18 moves inward toward the position shown in FIG. 3. Various conventional pressure sensors may be utilized and the unit illustrated in the drawings is a Trodyne Corporation Type 1201 indicator. A lever 15 carried on the housing 16 provides for manual testing of operation of the system. When the lever 15 is depressed, atmospheric pressure is substituted for the internal pressure of the blade and if the pressure sensor is working, the member 18 will move appropriately.

In the conventional pressure indicator, the cover 19 is a clear material such as a molded plastic and is provided with opaque white bands 20 on the inner surface. The member 18 is provided with alternating red and white bands 21, 22, respectively, and the bands 20–22 are disposed so that when the desired higher pressure differential is maintained, the pressure sensor presents an all white appearance to an external viewer as shown in FIG. 2. When a lower differential pressure exists and the member 18 moves to the position of FIG. 3, alternating red and white bands are presented to the viewer.

In the system of the invention, a radiation source 25 is mounted in a small opening at the surface of the member 18. The cover 19 is of such a material and thickness that, under normal operating conditions as shown in FIGS. 2 and 2a, the cover absorbs the radiation from the source, serving as a shield. A window, such as a thin wall section 26 in the cover 19, provides for radiation transmission from the source to the exterior of the cover when the member 18 moves to the position of FIG. 3 when the differential pressure drops. Radiation from the source 25 now passes through the window 26 to the detector 12 as the blade passes over the detector. Examples of suitable radiation sources are Strontium 90 and Americium 241. A beta source is preferred because the beta radiation emerging from the window is absorbed in about 2 meters of air, thereby substantially eliminating any danger of radiation to personnel.

Referring to FIG. 4, the radiation detector preferably is a Geiger Mueller tube 30 operated with a conventional power supply 31 and preamplifier on line driver 32. The detector provides an electrical pulse train output, with the pulse rate being a function of the intensity of radiation at the detector. In the preferred embodiment, a bias is provided at the detector by a small radiation source 33 mounted at the detector, so that the detector has a low frequency pulse train output with no radiation reaching the GM tube from the pressure indicator. This provides a failsafe operation as will be described below. When a rotor blade is leaking due to a crack or the like, the pressure differential drops and the member of the pressure sensor brings the radiation source opposite the window providing radiation to the GM tube. The detector then provides an output pulse train at a high rate, preferably in the order of two to five times that of the low rate no radiation output.

The output from the amplifier 32 is connected to a pulse amplifier 34 of the signal processor 13 which provides pulses of standard amplitude as inputs to an integrator or rate meter 35. The rate meter functions to provide a dc output the amplitude of which is proportional to the pulse rate at the input. The rate meter output is connected to a dc operational amplifier 36 with the output thereof connected as the input to two comparators 37, 38. The comparator outputs are connected to a relay driver circuit 39 which actuates a relay 40 connecting a warning lamp 41 to a power supply when the relay is unenergized, and connecting a safe lamp 42 to a power supply when the relay is energized.

The comparator 37 is the safe comparator and provides an output to the relay driver unit 39 when the input voltage to the comparator is greater than its calibration voltage. Similarly, the comparator 38 which is the warning comparitor, provides an output to the relay driver unit when the input voltage thereto is greater than its calibration voltage, which is greater than the calibration voltage of the comparator 37. The relay driver unit includes a logic circuit which permits energizing the relay 40 only when there is an output from the safe comparitor 37 and no output from the warning comparitor 38.

When the aircraft is in the normal operating condition with the desired pressure differential in all blades, there is no radiation from the sources to the detector and the detector bias output provides a low frequency pulse train to the signal processor. This results in an input voltage at the comparitors above the calibration voltage of the safe comparitor 37 but below the calibration voltage of the warning comparitor 38 so that there is an output to the relay driver only from the safe comparitor and the relay 40 is energized, thereby energizing the safe indicator light 42. If there is a leak in one or more of the blades resulting in a reduction in the pressure differential and movement of the pressure sensor member carrying the radiation source, there is a substantial increase in radiation at the detector with a corresponding increase in pulse frequency and in the input to the comparitors. There will continue to be an output from the safe comparator 37 but now there will also be an output from the warning comparator 38 since the input thereto is greater than its calibration voltage. The relay driver unit now de-energizes the relay 40 and the warning light 41 is energized providing the warning indication to the pilot. If there is any malfunction in the system such as loss of electrical power, failure of the radiation detector or failure of any of the components, there will be no input voltage to the safe comparator and no input to the relay driver with the result that the relay 40 remains unenergized and the warning light remains energized. This provides a failsafe mode of operation for the system.

It will be realized that the low frequency output from the detector, the safe comparator and the safe indicator are not necessary but highly desirable in most installations.

An analog output indication may be used in addition to or in place of the go-no go indication. The dc output from the rate meter 35, preferably from the amplifier 36, may be connected to a meter 50, preferably via a driver amplifier 51. In the circuit illustrated, the output at the rate meter is proportional to the pulse rate of the input and therefore the indication at the meter 50 will vary as a function of the moving member 18 of the pressure sensor 11 and hence as a function of the pressure in the blade. The meter indication may serve as the warning signal to the pilot.

For the go-no go type indication the pressure sensor preferably is designed to move the member 18 from one extreme position to the other extreme position for a relatively small change in pressure, such as about 1 psi. In contrast, for the analog type indication, it is preferred that the member 18 move over a much wider pressure range, such as the initial pressure differential so that the actual differential pressure can be indicated. The selection of sensor characteristic is up to the user.

The blade crack detection system utilizing nucleonic radiation provides a number of advantages over other proposed systems. A continuous indication is provided while in flight without requiring any electrical or physical contact with the blades, omitting any requirement for slip rings or the like for signal transmission. The detector can be mounted in any convenient location and requires only electrical connection with the circuitry and indicator. Periodic calibration of the system after installation is not required. The system may utilize conventional pressure sensors and conventional electronic circuit components while providing a new and unique system for blade crack detection.

WE CLAIM:

1. A system for indicating cracks in a hollow aircraft blade, wherein a pressure differential is maintained within the blade with respect to the ambient atmosphere, including in combination:
   a pressure sensor adapted for mounting on the blade in communication with the interior of the blade,
   said sensor including a member movable between a first position for a higher pressure differential and a second position for a lower pressure differential;
   a radiation source mounted on said member;
   a radiation shield positioned adjacent said member and having a radiation window, with said source disposed for radiation transmission through said window when said member is in said second position;

a radiation detector adapted for mounting on a non-rotating portion of the aircraft for receiving radiation from said source through said window; and circuit means having the output of said detector as an input and providing an output varying as a function of the position of said member.

2. A system as defined in claim 1 wherein the pressure within the blade normally is above atmospheric pressure and said sensor functions to move said member from said first position to said second position when the pressure in the blade falls below a predetermined value.

3. A system as defined in claim 1 wherein the pressure within the blade normally is below atmospheric pressure and said sensor functions to move said member from said first position to said second position when the pressure in the blade rises above a predetermined value.

4. A system as defined in claim 1 wherein said shield comprises a cover for said member, formed of radiation absorbing material and having a thin wall section forming said window.

5. A system as defined in claim 4 wherein said cover has alternating opaque and transparent sections and said member has corresponding alternating sections of contrasting appearance, with one of siad member sections disposed at said cover transparent sections when said member is in said first position, and with the other of said member sections disposed at said cover transparent sections when said member is in said second position.

6. A system as defined in claim 1 wherein said sensor includes manually actuable means for moving said member from said first position to said second position.

7. A system as defined in claim 1 wherein said circuit means includes:

an integrator having the detector pulse train as input and providing as output, a voltage level varying as a function of the pulse rate; and a first comparitor having the integrator output as input and providing a warning signal as output when the integrator output exceeds a first predetermined value.

8. A system as defined in claim 7 wherein said circuit means includes a second comparitor having the integrator output as input and providing a safe signal as an output when the integrator output exceeds a second lower predetermined value.

9. A system as defined in claim 8 including an indicator unit operable between an first safe indicating condition and a second warning indicating condition, said indicator unit having said integrator output as inputs and providing said first condition when said second comparitor provides a safe signal and said first comparitor provides no signal, and providing said second condition when said second comparitor provides no signal and when said first comparitor provides a warning signal.

10. A system as defined in claim 7 including means responsive to a voltage for providing a visual indication and having the integrator output as input.

11. A system as defined in claim 1 wherein said circuit means includes:

an integrator having the detector pulse train as input and providing as output, a voltage level varying as a function of the pulse rate; and means responsive to a voltage for providing a visual indication and having the integrator output as input.

12. A method of continuously indicating the condition of a hollow aircraft blade while in flight, including the steps of:

sealing the blade with a pressure differential therein with respect to the ambient atmosphere;

detecting a reduction in the pressure differential;

moving a radiation source on the blade between a shielded position for a higher pressure differential and an unshielded position for a lower pressure differential;

detecting radiation from the blade at a fixed location on the aircraft; and providing a warning signal when the detected radiation increases.

13. A method as defined in claim 12 wherein the blade pressure is normally above atmospheric.

14. A method as defined in claim 12 wherein the blade pressure is normally below atmospheric.

15. A method as defined in claim 12 including providing the warning signal when the detected radiation exceeds a predetermined value.

16. A method as defined in claim 12 including providing the warning signal as an analog indication of the amount of detected radiation.

* * * * *